United States Patent
Dudgeon et al.

(10) Patent No.: US 8,880,837 B2
(45) Date of Patent: Nov. 4, 2014

(54) PREEMPTIVELY ALLOCATING EXTENTS TO A DATA SET

(75) Inventors: Kyle B. Dudgeon, Tucson, AZ (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 555 days.

(21) Appl. No.: 13/217,137

(22) Filed: Aug. 24, 2011

(65) Prior Publication Data

US 2013/0054924 A1 Feb. 28, 2013

(51) Int. Cl.
*G06F 12/00* (2006.01)
*G06F 12/02* (2006.01)
*G06F 3/06* (2006.01)

(52) U.S. Cl.
CPC ............ *G06F 12/02* (2013.01); *G06F 12/0238* (2013.01); *G06F 12/023* (2013.01); *G06F 3/0608* (2013.01); *G06F 3/0605* (2013.01)
USPC ........... 711/170; 711/111; 711/112; 711/172; 711/173

(58) Field of Classification Search
None
See application file for complete search history.

(56) References Cited

U.S. PATENT DOCUMENTS

| | | | |
|---|---|---|---|
| 6,088,764 A * | 7/2000 | Shyam et al. | 711/112 |
| 2007/0192560 A1 | 8/2007 | Furuhashi | |
| 2008/0288718 A1 * | 11/2008 | Hepkin et al. | 711/104 |
| 2009/0030956 A1 | 1/2009 | Zhang et al. | |
| 2009/0327640 A1 | 12/2009 | Yao et al. | |
| 2010/0299489 A1 | 11/2010 | Balachandriah et al. | |

OTHER PUBLICATIONS

U.S Appl. No. 12/904,859, filed Oct. 14, 2010, "Using an Alias Volume Name for a Volume to Allocate Space to a Data Set".
"VSAM Demystified", IBM Redbooks, Doc. No. SG24-6105-01, Sep. 2003.

* cited by examiner

*Primary Examiner* — Matthew Bradley
*Assistant Examiner* — Alan Otto
(74) *Attorney, Agent, or Firm* — David W. Victor; Konrad Raynes Davda & Victor LLP (57) ABSTRACT

Provided are a computer program product, system, and method for preemptively allocating extents to a data set in a storage system. A data set is comprised of a plurality of extents configured in at least one volume in the storage system. A first extent is allocated to the data set in a first volume to extend the data set. A determination is made as to whether a second extent can be allocated to the data set in the first volume in response to the allocating of the first extent. The second extent in a second volume is allocated for the data set in response to determining that the second extent cannot be allocated to the data set in the first volume.

21 Claims, 6 Drawing Sheets

PREEMPTIVELY ALLOCATING EXTENTS TO A DATA SET

BACKGROUND OF THE INVENTION

1. Field of the Invention

The present invention relates to a computer program product, system, and method for preemptively allocating extents to a data set.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") includes Virtual Storage Access Method (VSAM) having a Direct Access Device Space Management (DADSM) routine which performs an extend operation to allocate a new extent to a data set if the current extent being written to in the data set has no more available space. (Z/OS is a registered trademark of IBM in the United States and other countries)

When the current extent being written has run out of available space, DADSM checks whether a data set can be allocated in a current volume in which the last data sets were allocated. If the DADSM determines that it cannot extend in the current volume either because the data set has reached a per volume extent limit for its data set type or the volume does not contain enough free space, then the DADSM needs to allocate a new extent in a different volume.

The operation to extend into a new volume can cause delays in writing to highly critical data sets while they have to wait for such operations to complete as ADDVOL, VOLUME SELECTION processing, and the complicated handshakes that must take place between components to complete the extend process into a different volume from the current volume in which extents were created.

There is a need in the art for improved techniques to allocate extents to a data set.

SUMMARY

Provided are a computer program product, system, and method for preemptively allocating extents to a data set in a storage system. A data set is comprised of a plurality of extents configured in at least one volume in the storage system. A first extent is allocated to the data set in a first volume to extend the data set. A determination is made as to whether a second extent can be allocated to the data set in the first volume in response to the allocating of the first extent. The second extent in a second volume is allocated for the data set in response to determining that the second extent cannot be allocated to the data set in the first volume.

DETAILED DESCRIPTION

Described embodiments provide techniques for preemptive allocation of a reserve extent to a data set after adding a current extent to a data sent in a current volume in which extents are being added. If extents following the current extent need to be allocated from a different volume than the current volume, then preemptive allocation after extending into the current extent in the current volume allows a reserve extent to be allocated and reserved in another volume in advance. This preemptive allocation of a reserve extent avoids latency and delays to allocate an extent in a different volume from the current volume after the current extent is filled.

Figure 1:
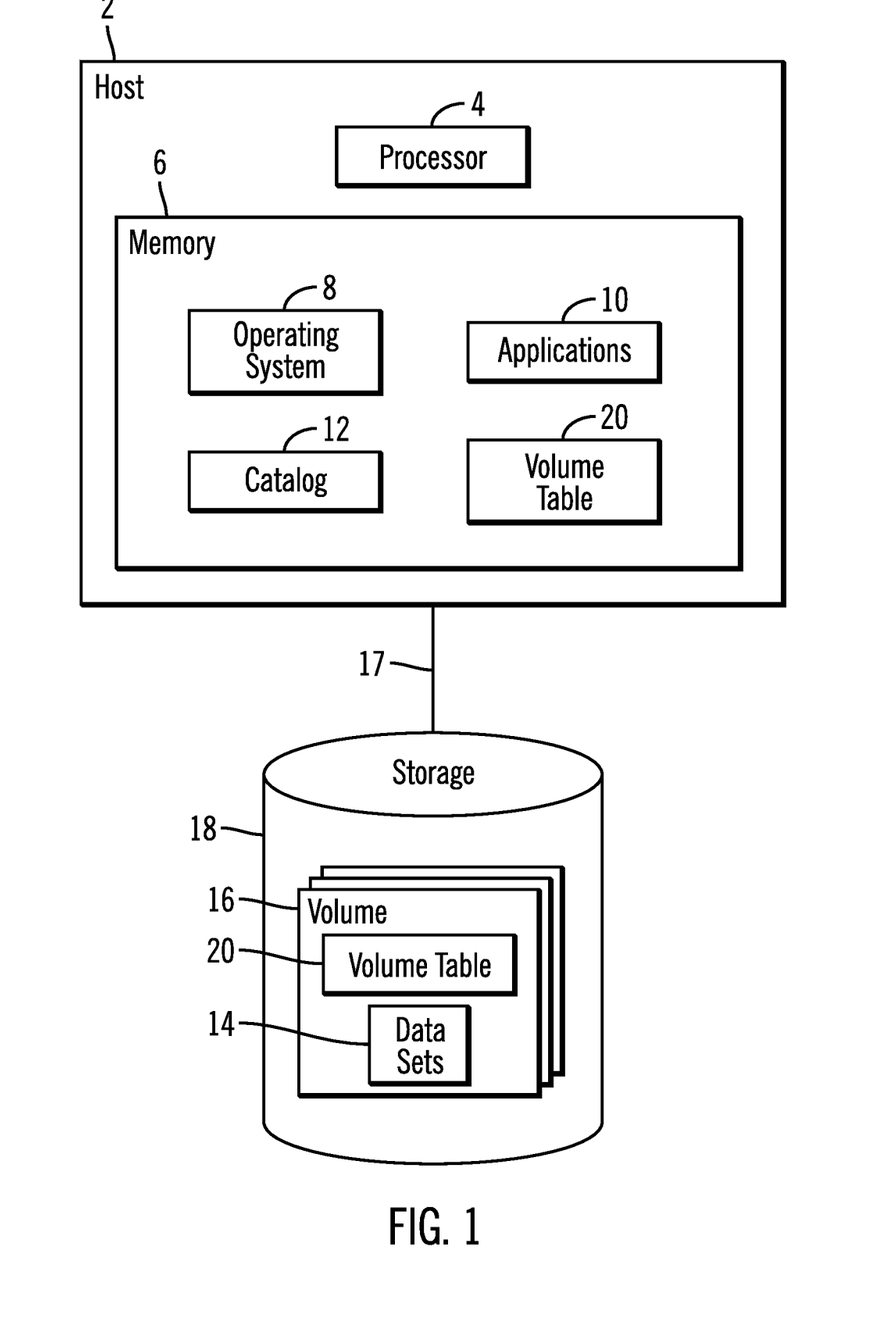
FIG. 1 illustrates an embodiment a computing environment.

FIG. 1 illustrates an embodiment of a computing environment. A host 2 includes a processor 4, which may comprise one or more processors, and a memory 6 including programs, such as an operating system 8 and application 10, and a data set catalog 12 providing information on data sets 14 stored in volumes 16 configured in storage space in a storage 18. The one or more applications 10 submit data requests to the operating system 8 that are sent to the storage 18. The host 2 may also receive data requests directed to the storage 18 from other systems that communicate with the host 2 via a network. In one embodiment, the memory 6 may comprise a volatile or non-volatile storage, such as a Dynamic Random Access Memory (DRAM), Random Access Memory (RAM) or a non-volatile memory, e.g., battery backed-up Random Access Memory (RAM), static RAM (SRAM), etc.

A data set 14 comprises a collection of data intended to be stored in a same logical allocation of data, such as data from a single application, user, enterprise, etc. A data set may 14 be comprised of separate files or records, or comprise a single file or record. The data sets 14 may comprise indexed data sets that are indexed according to a primary key that is used to locate records in the data set 14. Data set indexes provide an index for each indexed data set 14. For instance, the data set may comprise a Key Sequenced Data Set (KSDS) used in the IBM Virtual Storage Access Method (VSAM) storage, where each record in the KSDS data set has a unique key used to locate the record in the data set 14.

The host 2 may comprise a computational device known in the art, such as a workstation, mainframe, server, etc. The host 2 may communicate Input/Output (I/O) requests to a control unit for the storage 18, such as a storage subsystem or server, such as an enterprise storage server, storage controller, etc., or other device used to manage I/O requests to attached volumes. The storage 18 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The host 2 communicates with the storage 18 via a connection 17. The connection 17 may comprise a network such as a Local Area Network (LAN), Storage Area Network (SAN), Wide Area Network (WAN), peer-topeer network, wireless network, etc. Alternatively, the connection 17 may comprise a bus interface, such as a Peripheral Component Interconnect (PCI) bus or serial interface. The operating system 8 may comprise suitable operating systems known in the art, such as the International Business Machines ("IBM®") z/OS® operating system. (IBM and z/OS are trademarks of IBM in the United States and foreign countries).

The operating system 8 receives data requests from the applications 10. The applications 6 may include middleware, access methods, and independent software vendor (ISV) products. Data sets may hold critical data. The host 2 may also receive I/O requests from applications on systems over a network.

Each volume 16 includes a volume table 20 having information on the volume, including a mapping of tracks and extents of tracks to data sets 14. The volume table 20 may be stored in the volume 16, such as in the first few records of the volume, as in the case of a volume table of contents (VTOC), or may be stored as metadata external to the volume 16. The volume table 20 as well as data sets 14 are loaded into memory 6 to access.

Figure 2:
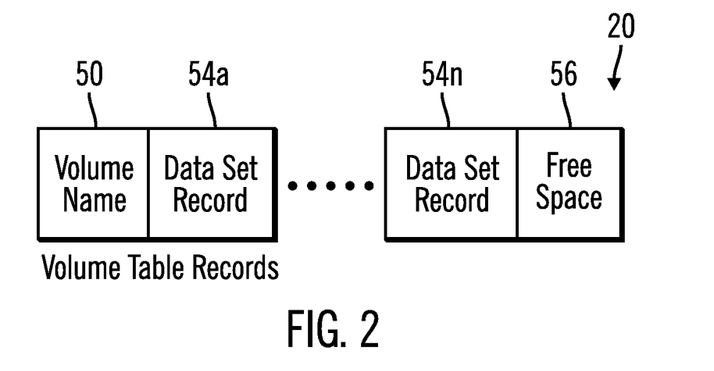
FIG. 2 illustrates an embodiment of volume table records.

FIG. 2 provides an embodiment of an arrangement of information maintained in an instance of a volume table 20 for one volume 16. The volume table 20 includes a volume name 50, also known as a volume serial number, e.g., a VOLSER, that provides a unique identifier of the volume. The volume name 20 may be included in the name of the volume table 20 in the volume 16. The volume table 20 instance further includes one or more data set records 54a . . . 54n indicating data sets having extents configured in the volume represented by the volume table 20. The volume table 20 further includes one or more free space records 56 identifying ranges of available tracks in the volume 20.

Figure 3:
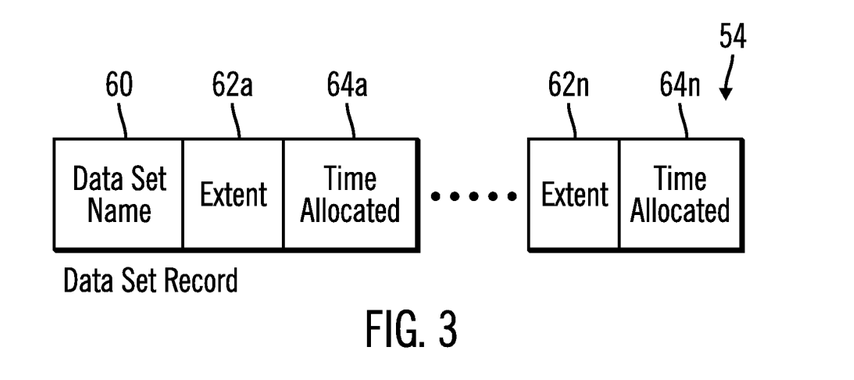
FIG. 3 illustrates an embodiment of a data set record.

FIG. 3 illustrates an embodiment of a data set record 54, such as the data set records 54a . . . 54n included in the volume table records 20. Each data set record 54 includes a data set name 60 and one or more extents 62a . . . 62n assigned to the data set 54. The extent provides a mapping to tracks in the volume identified by the volume table 20. The data set record further includes a time allocated 64a . . . 64n indicating for each extent 62a . . . 62n the time the extent was allocated to the data set 14 in the volume 16.

The reference numeral "n" used herein may refer to any number of instances of an element to which it is attached, and may refer to the same or different number of instances when used with different elements.

Figure 4:
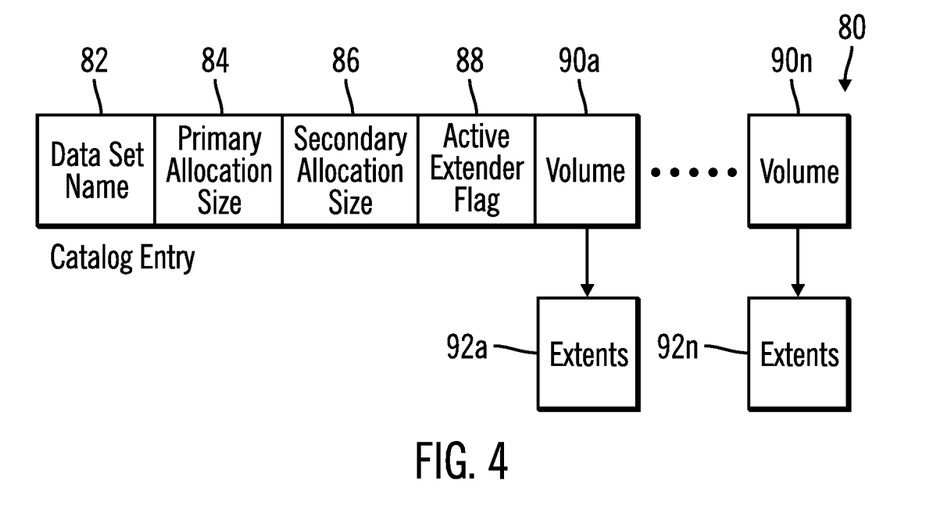
FIG. 4 illustrates an embodiment of a catalog entry.

The operating system 8 may maintain a data set catalog 12 providing metadata on data sets having extents in one or more volumes 20. FIG. 4 illustrates an embodiment of a catalog entry 80 in the catalog 12, including a data set name 82; a primary allocation size 84 indicating an amount of available space needed when initially assigning space from a volume; a secondary allocation size 86 indicating an amount of available space needed when assigning available space in a volume after the initial assignment and before another volume is considered; an active extender flag 88 indicating whether the data set is requiring additional extents at a considered relatively high frequency; volumes 90a . . . 90n in which the data set 82 is assigned extents 92a . . . 92n. The volumes 90a . . . 90n are listed in the order in which extents from the volume are assigned to the data set 82, and indicate base volume names or alias volume names. For each volume 90a . . . 90n, the catalog entry 80 identifies the extents 92a . . . 92n from the volume 90a . . . 90n that are assigned to the data set 82. The extents 92a . . . 92n for one volume may be listed in the order in which they are assigned to the data set 82. The catalog 12 may be organized by a key comprising the data set name to allow searching on the data set name to obtain the entry 80 for a data set name.

When creating a data set 14, the operating system 8 may create an entry 80 in the catalog 12 and indicate the primary 84 and secondary 86 allocation sizes. The operating system 8 may then locate a first volume 90a having the primary allocation size 86 available and assign a first extent in that volume 90a to the data set 14, and indicate the configured extent 92a in the catalog entry 80 for the created data set 14. The volume 90a would be used to assign further extents if the volume 90a has the secondary allocation size 86 of space available for further extents. In certain embodiments, the primary 84 and secondary 86 allocation sizes may be different, where the primary amount 84 is greater than the secondary amount 86, and in alternative embodiments the primary 84 and secondary 86 amounts may be the same.

Figure 5:
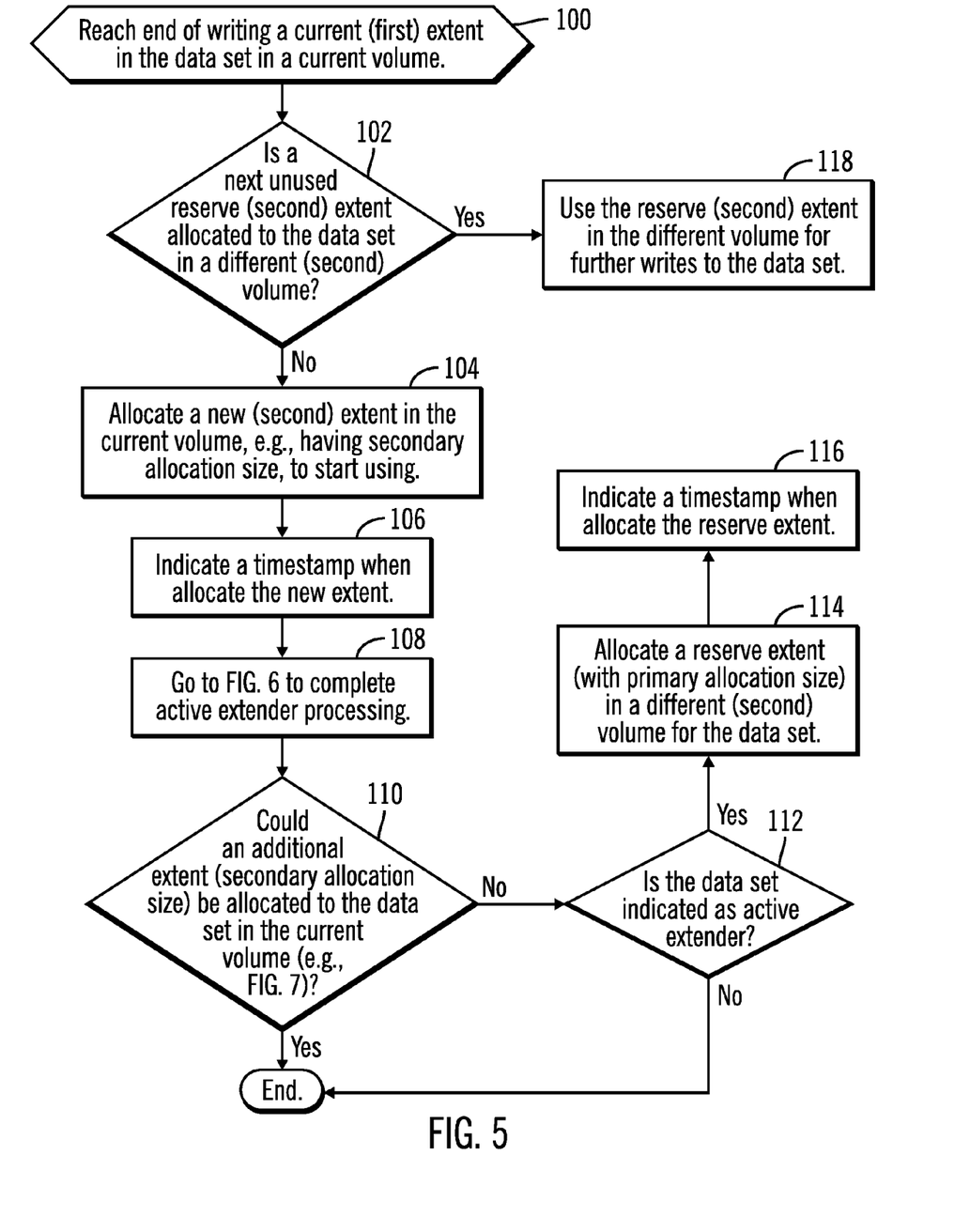
FIG. 5 illustrates an embodiment of operations to extend to allocate a new extent to the data set.

FIG. 5 illustrates an embodiment of operations performed by the operating system 8 to extend or allocate additional space to an existing data set 14. The operations in FIG. 5 assume that at least one or one or more extents were previously assigned from one current volume 16 to the data set 14. Upon filling (at block 100) a current extent to which data is currently being written in the data set 14 (which could be referenced as a first extent) in a current volume (which could be referenced as a first volume), the operating system 8 determines (at block 102) whether there is a next unused reserve extent (which could be referenced as a second extent) allocated to the data set 14 in a different volume (which could be referenced as a second volume). If (at block 102) there is no unused reserve extent allocated to the data set 14, then the operating system 8 allocates (at block 104) a new (second) extent in the current volume 16 having the secondary allocation size 86 to start using. The timestamp at which the extent is allocated is indicated (at block 106). In one embodiment, the timestamp of when allocated is indicated in the time allocated field 64n of the extent 62n (FIG. 3) comprising the new extent allocated in the current volume 16. Control then proceeds at block 108 to perform the operations of FIG. 6 to determine if the data set 14 being extended is an active extender, meaning the data set is determined to be extending into new extents at a considered relatively high frequency.

The operating system 8 then determines (at block 110) whether an additional extent having the secondary allocation size 86, not yet needed, can be allocated to the data set 14 in the current volume 16 in which the last extent was allocated at block 104. If so, control ends because the next extent needed by the data set 14 may be obtained from the current volume 16, which happens with very low latency. If (from the no branch of block 110) an additional extent cannot be allocated from the current volume 16 and the data set 14 is determined (at block 112) to be an active extender, as indicated in the active extender flag 88 (FIG. 4), then the operating system 8 allocates (at block 114) a reserve extent, having the primary allocation size 84, in a different (second) volume from the current volume in which the last extent was allocated. The timestamp of when the reserve extent is allocated is indicated (at block 116). In one embodiment, the time allocated may be indicated in the time allocated field 64a of the data set record 54a of the volume table 20 of the new volume in which the reserve extent is allocated. If (at block 112) the data set 14 is not indicated as an active extender, e.g., active extender flag 88 is not set, then control ends without allocating a reserve extent in a new volume. If (at block 102) a next unused reserved extent is allocated to the data set 14, then the operating system 8 uses (at block 118) the previously allocated reserve extent in the different volume for further writes to the data set 14.

Figure 6:
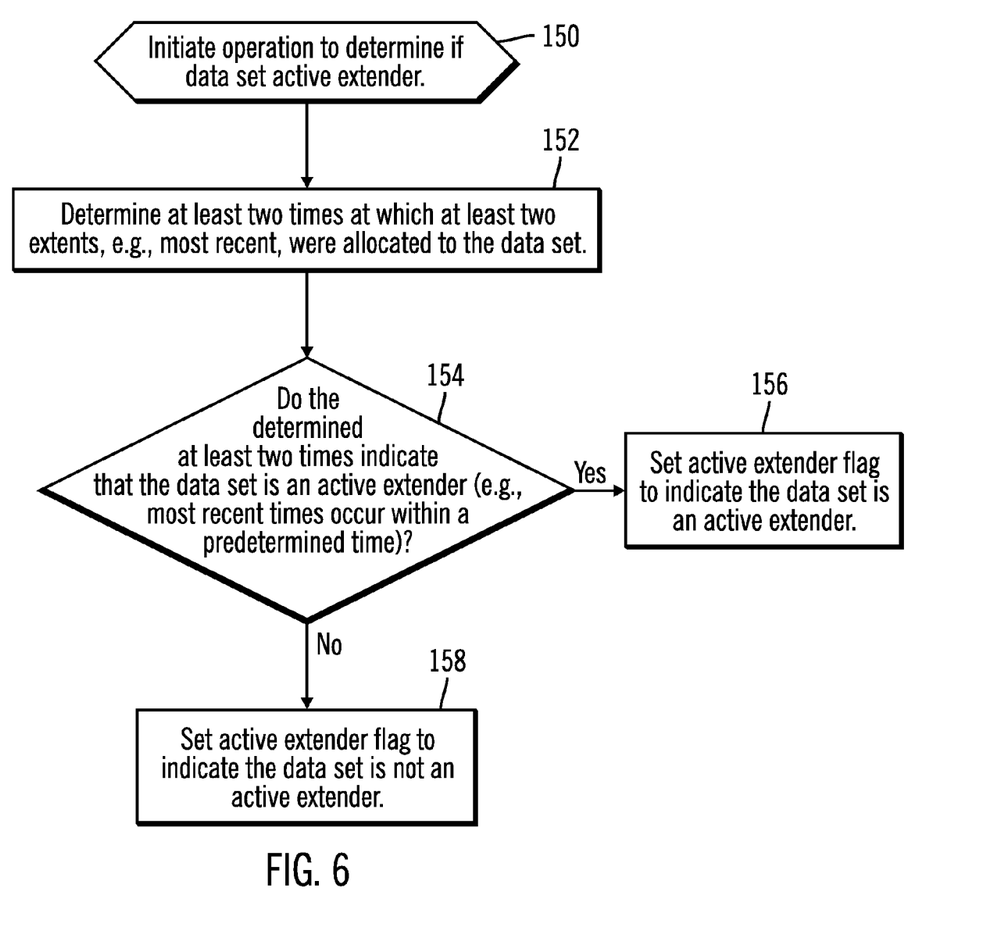
FIG. 6 illustrates an embodiment of operations to determine whether a data set is an active extender.

FIG. 6 illustrates an embodiment of operations performed by the operating system 8 to determine whether a data set 14 should be designated as an active extender, i.e., considered to have a relatively high frequency at which extents are added. Upon initiating the active extender determination (at block 150), the operating system 8 determines (at block 152) at least two times at which extents have been allocated to the data set 14, which may include the two or more of the most recent consecutive allocation times. If (at block 154) the determined at least two times indicate that the data set 14 is an active extender (e.g., the most recent times occur within a predetermined time), then the operating system 8 sets (at block 156) the active extender flag 88 to indicate the data set 14 as an active extender. Otherwise, if (at block 158) the at least two times at which extents were allocated do not fall within the predetermined time, then the operating system 8 sets (at block 158) the active extender flag 88 to indicate that the data set 14 is not an active extender.

In one embodiment, the operating system 8 uses at least two times at which extents were last allocated to determine active extender status by determining whether the last allocations, such as most recent allocations, occur within a predetermined time frame. In alternative embodiments, other algorithms may be applied to multiple previous allocation times of extents to the data set to determine whether the data set should be categorized as an active extender data set having a frequency of extends such that delays in allocating data sets to the extent can be minimized by preemptively allocating an extent in another volume to avoid delays from having to wait to allocate an extent in a different volume.

Figure 7:
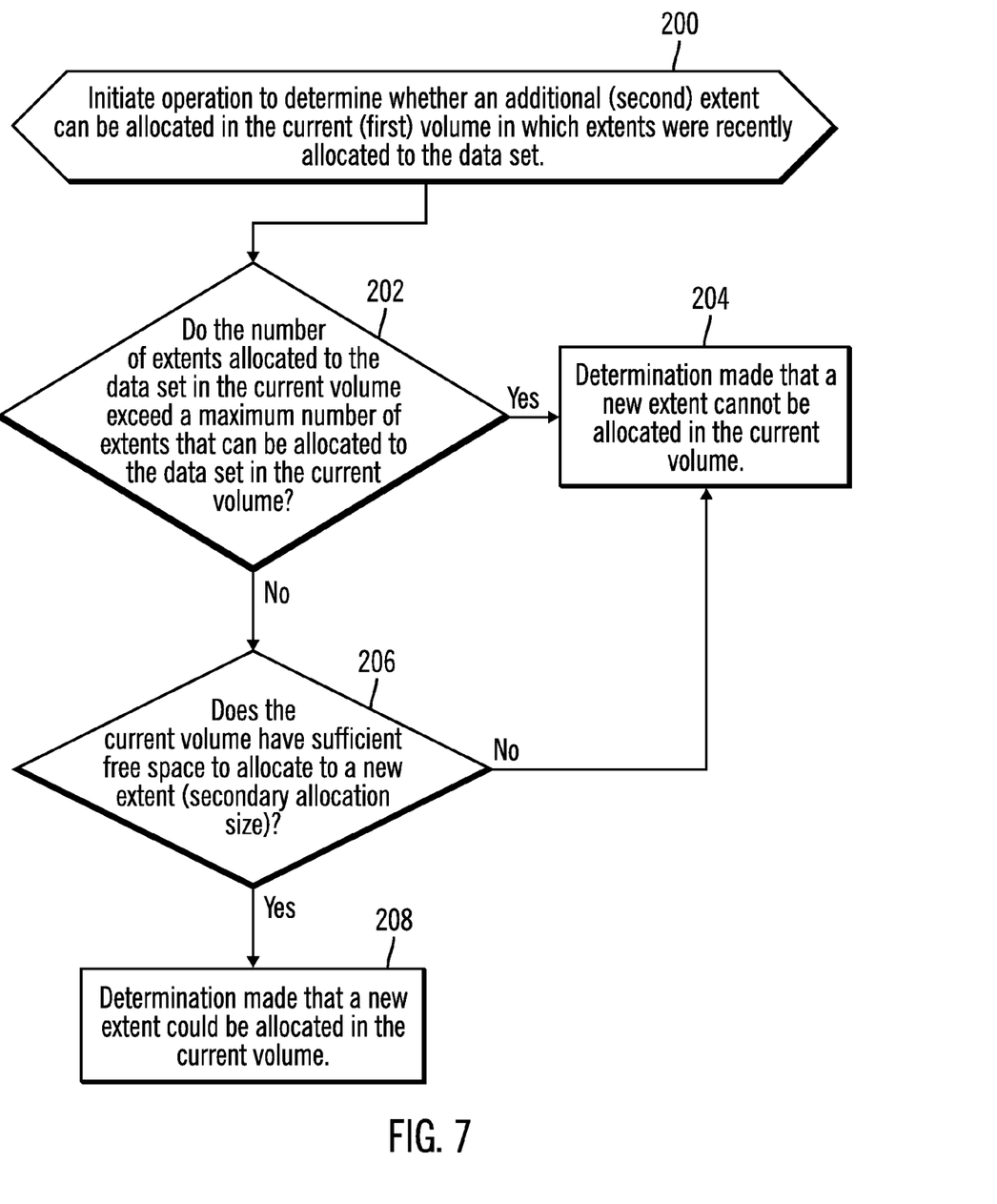
FIG. 7 illustrates an embodiment of operations to determine whether an additional extent can be allocated in the current volume in which extents have been recently allocated.

FIG. 7 provides an embodiment of the operation at block 110 in FIG. 5 to determine whether an additional extent can be allocated to the data set in the current volume in which extents have been allocated to the data set 14. Upon (at block 200) initiating this operation, the operating system 8 determines (at block 202) whether the number of extents currently allocated to the data set 14 in the current volume exceeds a maximum number of extents that can be allocated to the data set in the current volume according to operating system constraints. For instance, certain VSAM data sets have a limit of 123 extents per volume. The number of extents for a data set 14 in a particular volume can be determined from the volume 90*n* and extents 92*n* information (FIG. 4) in the catalog entry 80 of the data set 14. If (at block 202) more extents from the current volume can be assigned to the data set 14 (from the no branch of block 202), then the operating system 8 determines (at block 206) whether the current volume 16 has sufficient free space 56 (FIG. 2) to allocate to an additional extent having the secondary allocation size 86. If (at block 206) the current volume has sufficient free space, then the determination is made (at block 208) that a new extent could be allocated in the current volume 16. Otherwise, if no more extents can be allocated to the data set 14 from the current volume (from the yes branch of block 202) or the current volume does not have sufficient free space (from the no branch of block 206), then the determination is made (at block 204) that a new extent cannot be allocated in the current volume 16.

Figure 8:
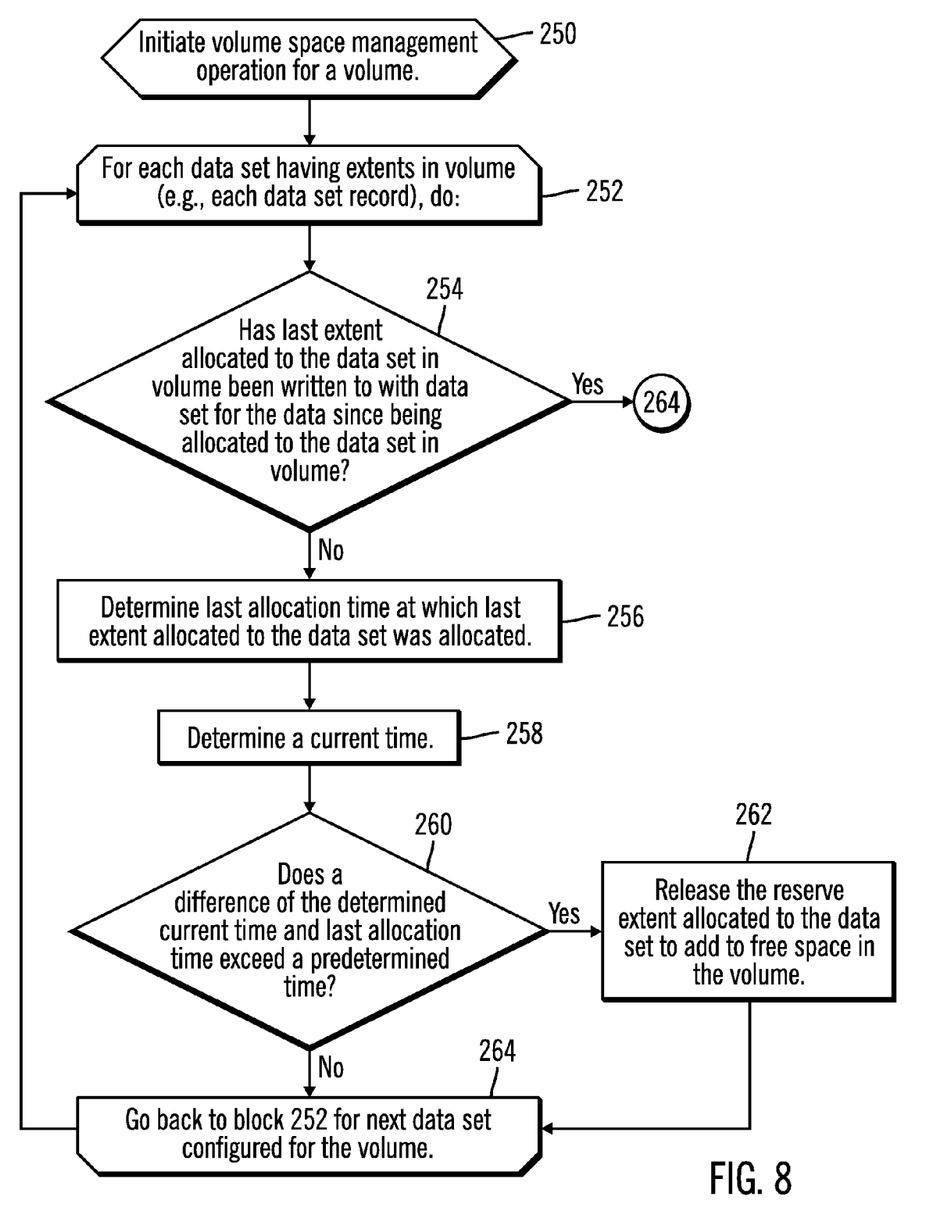
FIG. 8 illustrates an embodiment of a volume space management operation.

FIG. 8 illustrates an embodiment of operations performed by the operating system 8 to perform volume space management on the volumes 16 being managed to take into account that extents may be preemptively allocated, but not yet used. Upon initiating (at block 250) volume space management, the operating system 8 performs operations (at blocks 252-264) for each managed volume 16. For a volume 16, the operating system 8 determines (at block 254) whether the last extent allocated to the data set 14 in the volume 16 has been written to with data for the data set 14 since being allocated to the data set 14. In a VSAM embodiment, this determination may be made by considering an offset of a highest used relative byte address (HURBA) in the data set 14 and compare to a highest allocated relative byte address (HARBA) to determine if the extent having the HARBA includes the HURBA. If (at block 254) the preemptively allocated extent has not yet been written since allocated, then the operating system 8 determines (at block 256) the allocation time at which the last allocated extent, i.e., the reserve or preemptive extent, was allocated and a current time (at block 258). The allocation time may be determined from the time allocated field 64*n* for the last allocated extent 62*n* in the data set record 54 (FIG. 3). If (at block 260) the difference of the determined current time and last allocation time exceeds a predetermined time of acceptable non-use, then the operating system 8 releases (at block 262) the reserve extent allocated 62*n* to the data set 14 to add to the free space 56 (FIG. 2) in the volume 16. If the predetermined time is not exceeded then the unused reserve extent remains available for the data set 14.

Described embodiments allow for preemptive allocation of a reserve extent for a data set in a different volume from which extents were recently allocated before that reserve extent is needed. This allows the operating system 8 to avoid any delays incurred by having to wait to extend a data set to a new volume. Described embodiments take into account operating system limitations on the number of extents that can be assigned to a data set and available free space in the current volume in which extents are being allocated. Described embodiments further allow for the categorization of data sets as active extenders which would most benefit from the preemptive allocation of extents in new volumes to avoid such delays. Further, described embodiments provide for space management operations to release a preemptively allocated extent that has not been used since allocation for a time deemed excessive.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program for managing a data set comprised of extents in a storage system, the computer program product comprising a computer readable storage medium having computer readable program code embodied therein that executes to perform operations, the operations comprising:
    maintaining a data set comprised of a plurality of extents configured in at least one volume in the storage system;
    determining whether times at which at least two of the extents were allocated to the data set satisfy a criteria;
    allocating a first extent to the data set in a first volume to extend the data set, wherein the data set included the extents prior to allocating the first extent;
    determining whether a second extent can be allocated to the data set in the first volume in response to the allocating of the first extent; and
    allocating the second extent in a second volume for the data set in response to determining that the second extent cannot be allocated to the data set in the first volume and in response to the determining that the times satisfy the criteria.

2. The computer program product of claim 1, wherein a maximum number of extents can be allocated to the data set in the first volume, wherein the determination is made that the second extent cannot be allocated in the first volume in response to determining that a number of extents allocated to the data set in the first volume including the first extent equals the maximum number of extents.

3. The computer program product of claim 1, wherein determining whether the second extent can be allocated in the first volume comprises:
    determining whether the first volume has sufficient free space to allocate to the second extent, wherein the determination is made that the second extent cannot be allocated in response to determining that the first volume does not have the sufficient free space to allocate for the second extent.

4. The computer program product of claim 3, wherein the operations further comprise:
    maintaining a primary allocation size and a secondary allocation size for the data set;
    wherein the first volume is determined to have sufficient free space to allocate the second extent in response to determining the first volume has sufficient free space to allocate the secondary allocation size for the second extent, and wherein allocating the free space in the second volume for the second extent comprises allocating the primary allocation size in the second volume for the second extent.

5. The computer program product of claim 1, wherein the determined times at which the at least two extents were allocated includes a time the first extent was allocated to the data set.

6. The computer program product of claim 1, wherein the determining whether the times satisfy the criteria comprises determining that the times at least two most recently added consecutive extents were added to the data set are within a predetermined time, further comprising:
    indicating the data set as an active extender in response to determining that the times are within the predetermined time, wherein the second extent in the second volume is allocated in response to determining that the data set is the active extender; and
    indicating that the data set is not an active extender in response to determining that the at least two most recently added consecutive extents were not added to the data set within the predetermined time.

7. The computer program product of claim 1, wherein the operations further comprise:
    writing data set data to all available space in the first extent after allocating the second extent in the second volume;
    determining whether the second extent is allocated to the data set in response to writing to all the available space in the first extent;
    using the allocated second extent in the second volume to write data for the data set in response determining that the second extent is allocated; and
    allocating the second extent in the first volume in response to determining that the second extent is not allocated to the data set.

8. The computer program product of claim 1, wherein the operations further comprise:
    determining whether data set data was written to the second extent since being allocated to the data set;
    in response to determining that the second extent has not been written to since being allocated:
        determining an allocation time at which the second extent was allocated in the second volume;
        determining a current time;
        determining whether a difference of the current time and the allocation time exceeds a predetermined time; and
        releasing the second extent from the data set in the second volume to add to free space in the second volume in response to determining that the difference exceeds the predetermined time.

9. The computer program product of claim 1, wherein a maximum number of extents can be allocated to the data set in the first volume, wherein the determining of whether the second extent can be allocated to the data set in the first volume comprises:
    determining whether a number of extents allocated to the data set in the first volume including the first extent equals the maximum number of extents;
    determining whether the first volume has sufficient space to allocate for the second extent;
    in response to determining that the number of extents allocated equals the maximum number of extents in the first volume or determining that the first volume has sufficient space to allocate the second extent, performing the determining whether the times at which the at least two extents were allocated satisfy the criteria.

10. A system for managing a data set comprised of extents in a storage system, comprising:
    a processor; and
    a computer readable storage medium including code executed by the processor to perform operations, the operations comprising:
        maintaining a data set comprised of a plurality of extents configured in at least one volume in the storage system;
        determining whether times at which at least two of the extents were allocated to the data set satisfy a criteria;
        allocating a first extent to the data set in a first volume to extend the data set, wherein the data set included the extents prior to allocating the first extent;
        determining whether a second extent can be allocated to the data set in the first volume in response to the allocating of the first extent; and
        allocating the second extent in a second volume for the data set in response to determining that the second extent cannot be allocated to the data set in the first volume and in response to the determining that the times satisfy the criteria.

11. The system of claim 10, wherein a maximum number of extents can be allocated to the data set in the first volume, wherein the determination is made that the second extent cannot be allocated in the first volume in response to determining that a number of extents allocated to the data set in the first volume including the first extent equals the maximum number of extents.

12. The system of claim 10, wherein determining whether the second extent can be allocated in the first volume comprises:
   determining whether the first volume has sufficient free space to allocate to the second extent, wherein the determination is made that the second extent cannot be allocated in response to determining that the first volume does not have the sufficient free space to allocate for the second extent.

13. The system of claim 10, wherein the determining whether the times satisfy the criteria comprises determining that the times at least two most recently added consecutive extents were added to the data set are within a predetermined time, further comprising:
   indicating the data set as an active extender in response to determining that the times are within the predetermined time, wherein the second extent in the second volume is allocated in response to determining that the data set is the active extender; and
   indicating that the data set is not an active extender in response to determining that the at least two most recently added consecutive extents were not added to the data set within the predetermined time.

14. The system of claim 10, wherein the operations further comprise:
   writing data set data to all available space in the first extent after allocating the second extent in the second volume;
   determining whether the second extent is allocated to the data set in response to writing to all the available space in the first extent;
   using the allocated second extent in the second volume to write data for the data set in response determining that the second extent is allocated; and
   allocating the second extent in the first volume in response to determining that the second extent is not allocated to the data set.

15. A method, comprising:
   maintaining a data set comprised of a plurality of extents configured in at least one volume in a storage system;
   determining whether times at which at least two of the extents were allocated to the data set satisfy a criteria;
   allocating a first extent to the data set in a first volume to extend the data set, wherein the data set included the extents prior to allocating the first extent;
   determining whether a second extent can be allocated to the data set in the first volume in response to the allocating of the first extent; and
   allocating the second extent in a second volume for the data set in response to determining that the second extent cannot be allocated to the data set in the first volume and in response to the determining that the times satisfy the criteria.

16. The method of claim 15, wherein a maximum number of extents can be allocated to the data set in the first volume, wherein the determination is made that the second extent cannot be allocated in the first volume in response to determining that a number of extents allocated to the data set in the first volume including the first extent equals the maximum number of extents.

17. The method of claim 15, wherein determining whether the second extent can be allocated in the first volume comprises:
   determining whether the first volume has sufficient free space to allocate to the second extent, wherein the determination is made that the second extent cannot be allocated in response to determining that the first volume does not have the sufficient free space to allocate for the second extent.

18. The method of claim 15, wherein the determining whether the times satisfy the criteria comprises determining that the times at least two most recently added consecutive extents were added to the data set are within a predetermined time, further comprising:
   indicating the data set as an active extender in response to determining that the times are within the predetermined time, wherein the second extent in the second volume is allocated in response to determining that the data set is the active extender; and
   indicating that the data set is not an active extender in response to determining that the at least two most recently added consecutive extents were not added to the data set within the predetermined time.

19. The method of claim 15, wherein the operations further comprise:
   writing data set data to all available space in the first extent after allocating the second extent in the second volume;
   determining whether the second extent is allocated to the data set in response to writing to all the available space in the first extent;
   using the allocated second extent in the second volume to write data for the data set in response determining that the second extent is allocated; and
   allocating the second extent in the first volume in response to determining that the second extent is not allocated to the data set.

20. The system of claim 10, wherein the determined times at which the at least two extents were allocated includes a time the first extent was allocated to the data set.

21. The method of claim 15, wherein the determined times at which the at least two extents were allocated includes a time the first extent was allocated to the data set.

* * * * *